(12) United States Patent  
Yamamoto et al.

(10) Patent No.: US 8,562,430 B2  
(45) Date of Patent: Oct. 22, 2013

(54) GAME SYSTEM, METHOD OF CONTROLLING COMPUTER AND STORAGE MEDIUM

(75) Inventors: Takao Yamamoto, Minato-ku (JP); Shota Katagiri, Minato-ku (JP); Yuma Takafuji, Minato-ku (JP); Masahiro Kiyomoto, Minato-ku (JP); Mayumi Okuyama, Minato-ku (JP); Tatsuya Iyama, Minatu-ku (JP); Makiko Ota, Minatu-ku (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 122 days.

(21) Appl. No.: 13/243,865

(22) Filed: Sep. 23, 2011

(65) Prior Publication Data  
US 2012/0077590 A1    Mar. 29, 2012

(30) Foreign Application Priority Data  
Sep. 27, 2010   (JP) .................................. 2010-215599

(51) Int. Cl.  
*G07F 17/32*   (2006.01)

(52) U.S. Cl.  
USPC .............................................. 463/31; 463/42

(58) Field of Classification Search  
USPC ...................................................... 463/31, 42  
See application file for complete search history.

(56) References Cited

U.S. PATENT DOCUMENTS 5,718,632  A      2/1998  Hayashi  
7,192,353  B2 *  3/2007  Okubo ............................ 463/43

FOREIGN PATENT DOCUMENTS

JP              2742394  B2     4/1998

* cited by examiner

*Primary Examiner* — Omkar Deodhar  
(74) *Attorney, Agent, or Firm* — Howard & Howard Attorneys PLLC

(57) ABSTRACT

A game system includes: a display device that displays a screen of a game; and partial information presenting device that causes the display device to display a part of customization information of which setting is to be performed by a player on the game by utilizing waiting time of the game, and wherein the partial information presenting device varies a display range which is to be displayed at the display device as a part of the customization information in accordance with customization time allocated to setting of the customization information among the waiting time of the game so that the amount of the customization information included in the display range is increased when the customization time is long and is decreased when the customization time is short.

15 Claims, 10 Drawing Sheets

GAME SYSTEM, METHOD OF CONTROLLING COMPUTER AND STORAGE MEDIUM

CROSS-REFERENCE TO RELATED APPLICATION

This application claims the benefit of Japanese Patent Application 2010-215599, filed on Sep. 27, 2010, the entire disclosure of which is incorporated by reference herein.

TECHNICAL FIELD

The present invention relates to a game system capable of customizing setting of a game by a player, and a method of controlling a computer and a storage medium.

BACKGROUND ART

There exists a game system in which a game capable of customizing setting of a game by a player is executed. Further, there has been known a game device requiring time to start a game, and having a mini-game played during reading a main-game by reading the mini-game before reading the main-game (for example, see Patent Literature 1). Patent Literature 1: Japanese Patent No. 2742394.

SUMMARY OF INVENTION

A variety of waiting time may occur in a game. As an example of such waiting time, there exist time required to determine an opponent in a match-up type game as competing with results between matched opponents and reading time for starting a game. Further, in a game capable of customizing game setting by a player, more time is required for setting customization. Accordingly, time required for the entire game tends to be long. In Patent Literature 1, a game device causes a player to play a separate game until a main-game is started. However, even if the separate game is played, waiting time until starting of the main-game is not shortened. That is, the game device of Patent Literature 1 does not intend to shorten time required for an entire game.

It is an object of the present invention to provide a game system capable of shortening entire game time for a game in which setting in the game can be customized by a player, and a method of controlling a computer and a computer program used for the game system.

A game system according to the present invention includes a display device (8) that displays a screen (50) of a game, and partial information presenting device (10) that causes the display device to display a part of customization information (29) of which setting is to be performed by a player on the game by utilizing waiting time of the game, and wherein the partial information presenting device varies a display range which is to be displayed at the display device as a part of the customization information in accordance with customization time allocated to setting of the customization information among the waiting time of the game so that the amount of the customization information included in the display range is increased when the customization time is long and is decreased when the customization time is short.

According to the present invention, a part of the customization information is displayed at the waiting time without game proceeding. Further, the display range of the customization information to be displayed at the waiting time of the game is varied in accordance with length of the customization time so as to include more information when the customization time is long and to include less information when the customization time is short. Furthermore, the customization time is increased and decreased in accordance with the waiting time. That is, the customization information is displayed in the range corresponding to the waiting time. Accordingly, the player can perform setting of the customization information in an appropriate range corresponding to the length of the waiting time. Also, since the customization time is allocated to the waiting time, it is not required to separately ensure time for setting the customization information. Accordingly, it is possible to shorten entire game time.

In an aspect of the game system of the present invention, a match-up type game as competing with results between matched opponents may be executed as the game, and matching time for the matching included in the waiting time of the game may be utilized as the customization time. In this case, since the matching time can be effectively utilized, the entire game time can be more effectively shortened.

In an aspect of the game system of the present invention, the partial information presenting device may vary the display range so that information of a predetermined range among the customization information is included in the display range in preference to other information. In this case, the setting against the information of the predetermined range can be performed in preference to the other information.

In an aspect of the game system of the present invention, the game system further includes a extending device (10) that extends the customization time, and the extending device may extend the customization time when setting the information of the predetermined range is not completed. In this case, the setting against the customization information included in the predetermined range can be performed more surely.

In an aspect of the game system of the present invention, the game system further includes a discrimination information adding device (10) that adds discrimination information to be utilized for discriminating the information of the predetermined range among the customization information from other information, and the partial information presenting device may display the display range so that information to which the discrimination information is added among the customization information is included as the information of the predetermined range. In this case, the customization information selected by a player can be included in the predetermined range to be preferentially displayed.

In an aspect of the game system of the present invention, the partial information presenting device may display the part of the customization information within the display range in order of previously-set specific priority order. In this case, the customization information can be displayed in the display range in order of the specific priority order. In this aspect, priority information adding device (10) that adds information of priority order to at least at the part of the customization information may be further included, and the partial information presenting device may display the part of the customization information sequentially within the display range by utilizing the priority order information added by the priority information adding device as the specific priority order. In this case, player's setting can be reflected to the priority order of the customization information to be displayed in the display range. In this aspect, the partial information presenting device may further include display target varying device (10) that varies information to be included in the display range as the part of the customization information from information based on the priority order information to information based on predetermined conditions when the customization time is shorter than fixed time. In this case, it is possible to vary the customization information to be included in the display range from the information set by a player to the information based on the predetermined conditions when the customization time is short as being shorter than the fixed time. For this reason, for example, when the customization time is shorter than fixed time, the customization information capable of being set in a short time can be displayed with high priority order than that of the information set by the player. Accordingly, it is possible to encourage setting of more appropriate customization information in a shorter time.

In the aspect including the display target varying device, a variety of conditions may be adopted as the predetermined conditions as long as the setting of the appropriate customization information in a short time is to be encouraged. For example, in an aspect of the game system of the present invention, the customization information may include customization entries (72) respectively corresponding to elements which constitute the game and a plurality of customization items (73) which are prepared as options for each customization entry, the partial information presenting device may utilize the customization entries as units of information to be included in the display range being a part of the customization information, and the display target varying device may utilize a condition that priority order increases with decrease of the number of the plurality of customization items of each customization entry as the predetermined conditions.

In an aspect including at least one of the discrimination information adding device and the priority information adding device, the game system may further include a entire information presenting device (10) that causes the display device to display a normal customization screen (80A, 80B) capable of displaying the entire customization information, and at least one of the discrimination information adding device and the priority information adding device may be provided in the normal customization screen. In this case, it is possible to encourage adding of discrimination information or adding of priority information via the normal customization screen.

A method of controlling a computer (10) of the present invention includes following processes. The computer is mounted in the game system including a display device (8) that displays a screen (50) of a game. The processes are: a partial information presenting process that causes the display device to display a part of customization information (29) of which setting is to be performed by a player on the game by utilizing waiting time of the game; and a process in the partial information presenting process to vary a display range which is to be displayed at the display device as a part of the customization information in accordance with customization time allocated to setting of the customization information among the waiting time of the game so that the amount of the customization information included in the display range is increased when the customization time is long and is decreased when the customization time is short.

Further, a storage medium stores a computer program for a game system of the present invention being configured to allow a computer (10) mounted in the game system including a display device (8) that displays a screen (50) of a game to serve as; a partial information presenting device that causes the display device to display a part of customization information (29) of which setting is to be performed by a player on the game by utilizing waiting time of the game; and wherein the partial information presenting device further serves as a device that varies a display range to be displayed at the display device as a part of the customization information in accordance with customization time allocated to setting of the customization information among the waiting time of the game so that the amount of the customization information included in the display range is increased when the customization time is long and is decreased when the customization time is short. By executing the control method or the computer program of the present invention, the game system of the present invention can be actualized.

In the above description, reference numerals of the attached drawings are given in parentheses in order to facilitate understanding of the present invention. However, the present invention is not limited to embodiments of the drawings thereby.

As described above, according to the present invention, entire game time can be shortened for a game in which a player can customize setting of the game.

DETAILED DESCRIPTION OF EMBODIMENTS

Figure 1:
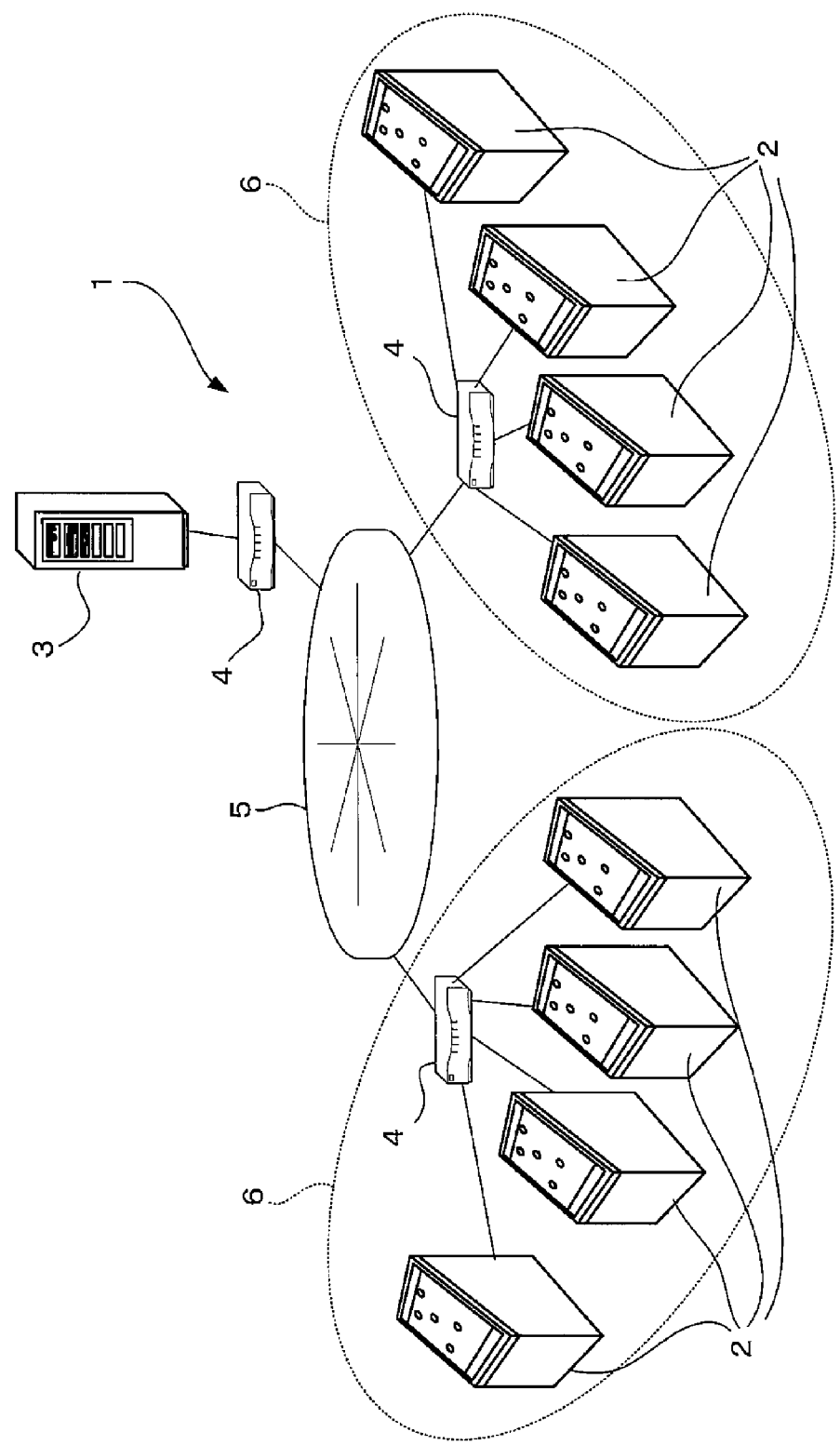
FIG. 1 is a view illustrating an entire structure of a game system according to an embodiment of the present invention.

FIG. 1 is a view illustrating a game system 1 according to an embodiment of the present invention. As illustrated in FIG. 1, in the game system 1, a plurality of game machines 2 and a center server 3 are connected to a network 5 respectively via a router 4. Not limited to the example in which the center server 3 is constituted with a single physical device, it is also possible to constitute a single ideal center server 3 with server groups as a plurality of physical devices. Here, the Internet is adopted as the network 5. However, the network 5 is not limited to the Internet as long as a communication line is used.

Each game machine 2 is constituted as a business-use game machine and an appropriate number of the game machines 2 are placed in a commercial facility such as an arcade 6. The router 4 is installed corresponding to each arcade 6 and the center server 3. The game machines 2 in the same arcade 6 are connected to the network 5 via the common router 4. In addition, a local server may be placed between the game machines 2 and the router 4 of the arcade 6, and that the game machines 2 may be communicably connected to the center server 3 via the local server.

In the center server 3, there are provided a control unit (not illustrated) which is constituted as a computer including a microprocessor, a ROM in which programs such as an operating system to be executed by the microprocessor are stored, and an internal storage device (not illustrated) such as a RAM which provides an operational area for the microprocessor. Further, an external storage device (not illustrated) is connected to the center server 3. The external storage device stores programs for various servers to be executed by the control unit and various data to be referred by the program.

Figure 2:
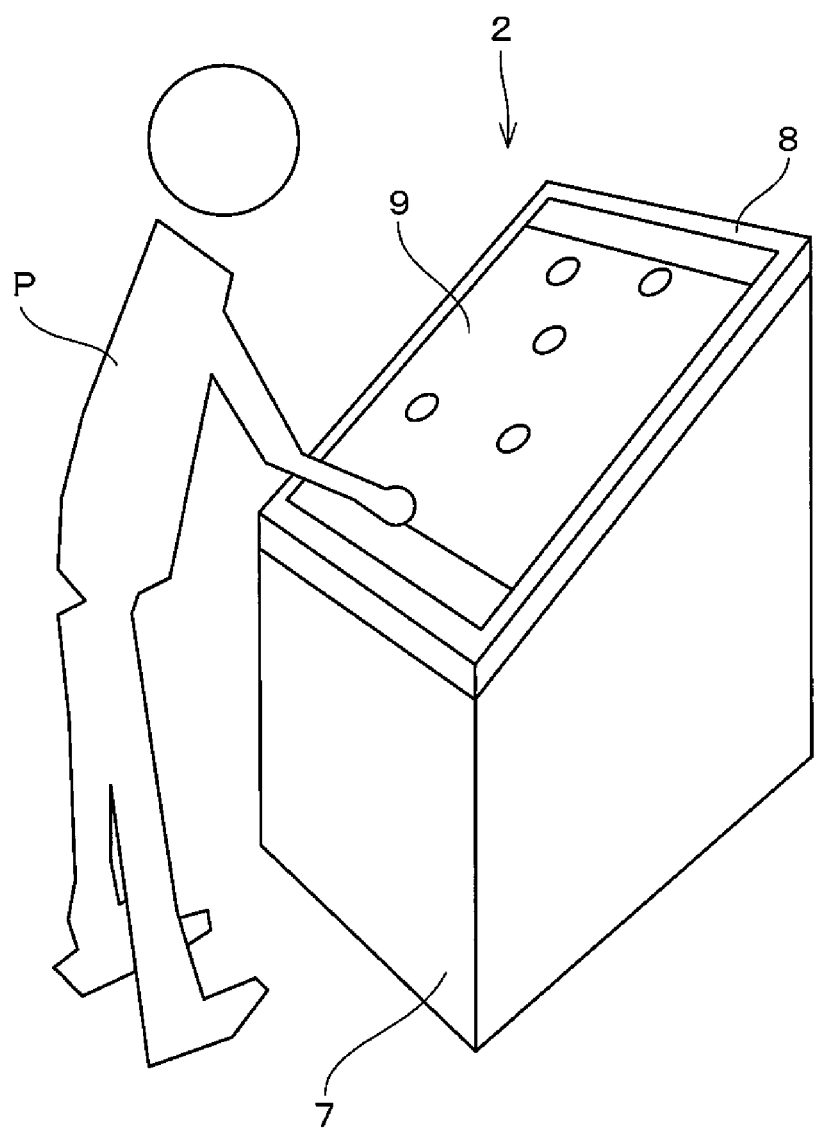
FIG. 2 is an explanatory view for explaining a structure of a game machine.

FIG. 2 is an explanatory view for explaining a structure of the game machine 2. As illustrated in FIG. 2, the game machine 2 includes a housing 7, and a monitor 8 as a display device arranged at an upper face of the housing 7 as being inclined toward a player P side. A transparent touch panel 9 is overlapped to a surface of the monitor 8. The touch panel 9 is a known input device which outputs a signal corresponding to the contact position when the player P touches with a finger and the like. In addition, the game machine 2 includes various input devices and output devices such as a button for performing selection or determination, a power switch, a volume operation switch and a power lamp which are included in an ordinal business-use game machine. However, these are not illustrated in FIG. 2.

Figure 3:
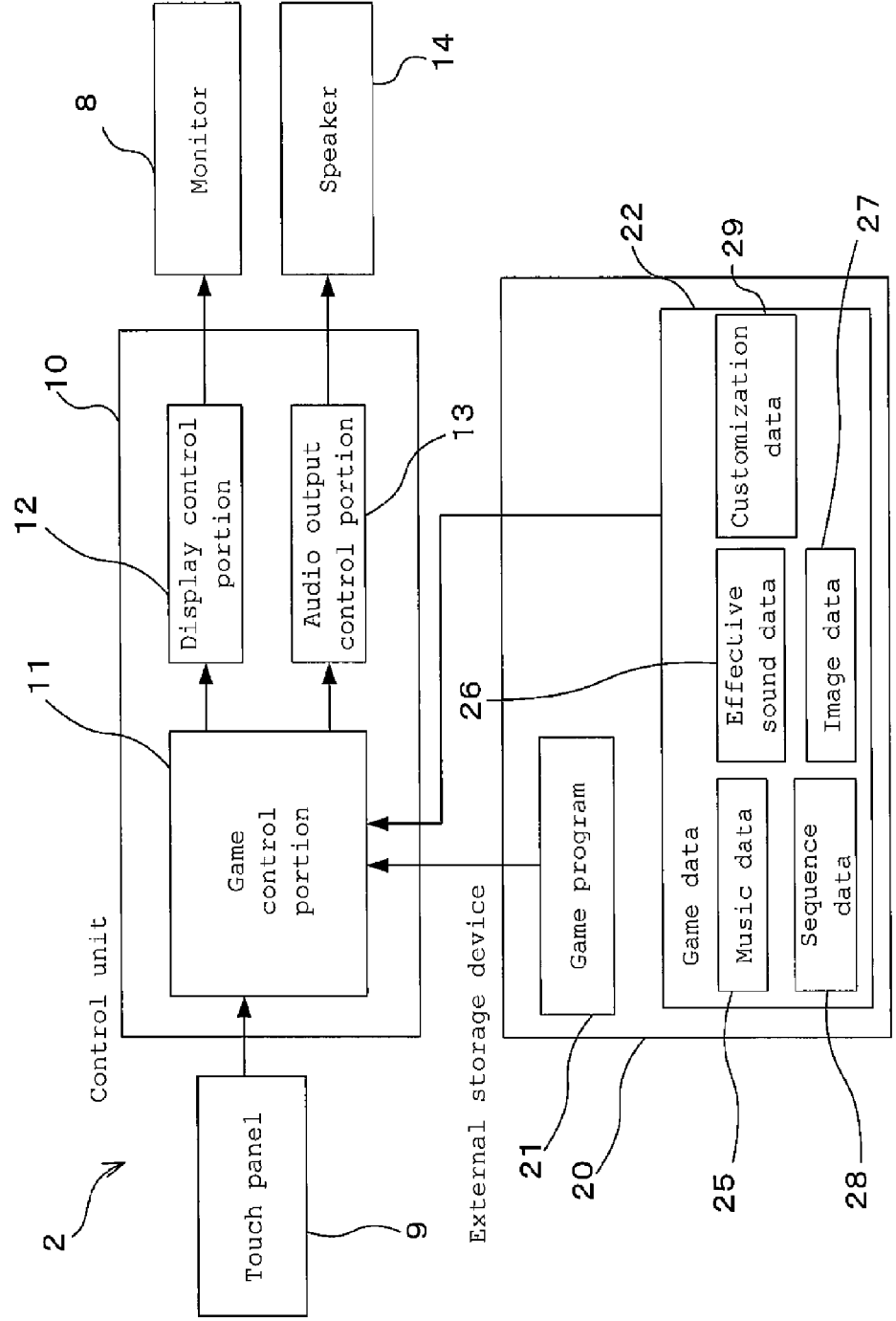
FIG. 3 is a functional block diagram of the game machine.

FIG. 3 is a functional block diagram of the game machine 2. As illustrated in FIG. 3, a control unit 10 as a computer is provided inside of the housing 7. The control unit 10 includes a game control portion 11 as a control main part, a display control portion 12 which operates in accordance with output from the game control unit 11, and an audio output control portion 13. The game control unit 11 is structured as a unit obtained by combining a microprocessor with a various peripheral devices such as an internal storage device (e.g., a ROM and a RAM) which are necessary for operation of the microprocessor. The display control portion 12 displays a predetermined image on the monitor 8 by drawing an image at a frame buffer in accordance with image data supplied from the game control unit 11 and outputting a video signal corresponding to the drawn image to the monitor 8. The audio output control portion 13 reproduces predetermined audio (including a music sound) from a speaker 14 by generating an audio reproduction signal in accordance with audio reproduction data supplied from the game control unit 11 and outputting the signal to the speaker 14 as an audio output device which is connected to the control unit 10.

An external storage device 20 is connected to the game control portion 11. As the external storage device 20, there is applied a storage medium capable of maintaining storage without receiving power such as an optical storage medium (e.g., DVDROM, CDROM and the like) and a non-volatile semiconductor memory device (EEPROM and the like).

The external storage device 20 stores a game program 21 and game data 22. The game program 21 is a computer program which is necessary for executing a music game with the game machine 2 in accordance with predetermined procedure. When the game machine 2 is started-up, the game control portion 11 performs various initialization required for operating the game machine 2 by executing an operation program which is stored in the internal storage device. Subsequently, the game control portion 11 sets environments for playing the music game in accordance with the game program 21 by reading the game program 21 from the external storage device 20 and executing the game program 21. The game control portion 11 is a logical device which is actualized by a combination of computer hardware and the computer program. The game control portion 11 performs music game processes such as instructing the player to perform operation in accordance with reproduction of the music (tune) which is selected by the player or generating an effective sound in accordance with an operation of the player. Further, the game control portion 11 performs processes such as evaluating the player's operation and controlling of the game in accordance with the evaluation result.

The game data 22 includes various data to be referred when the music game is executed in accordance with the game program 21. For example, the game data 22 includes music data 25, effective sound data 26 and image data 27. The music data 25 is the data required for reproducing and outputting music to be a target of the game from the speaker 14. Although FIG. 3 illustrates one kind of music data 25, the player can select music to be played from a plurality of music. The plurality of music data 25 is stored in the game data 22 with information to identify music. The effective sound data 26 is the data in which plural kinds of effective sounds to be output from the speaker 14 in response to the player's operation are stored as corresponding to a unique code for each effective sound. The effective sounds include a various types of sounds of instruments and the like. The effective sound data may be prepared with a predetermined number of octaves as varying tones corresponding to the respective kinds. The image data 27 is the data for displaying background images, various objects, icons and the like in the game screen to the monitor 8.

The game data 22 further includes sequence data 28 and customization data 29. The sequence data 28 is the data defining operations and the like to be instructed to the player. At least one sequence data 28 is prepared for one piece of the music data corresponding to one piece of music. The customization data 29 is the data defining a variety of customization information such as effective sounds and BGM at the time of operation to be set by the player. Details of the customization information will be described later. Here, the customization information includes auxiliary information to constitute the game such as background of the screen, brightness of the screen, characters appearing on the game, and arrangement of various screen displaying items, and other information directly related to the game within a range not causing influence to later-mentioned matching conditions.

Next, a general outline of the music game executed at the game machine 2 will be described. The game machine 2 is constituted as a music game machine of a match-up type in which two players (including a case that the game machine 2 functions as a counterpart player) perform operations in accordance with music and compete to each other for evaluation of the operation timing thereof.

Before the game is started, a matching-request for demanding an opponent is executed to the center server 3 from each game machine 2 via the network 5. The center server 3 performs matching between two game machines 2 which are to be opponents to each other based on the matching-requests from the respective game machines 2. The respective game machines 2 of which opponents are respectively determined based on a specification of the center server 3 start the music game.

Figure 4:
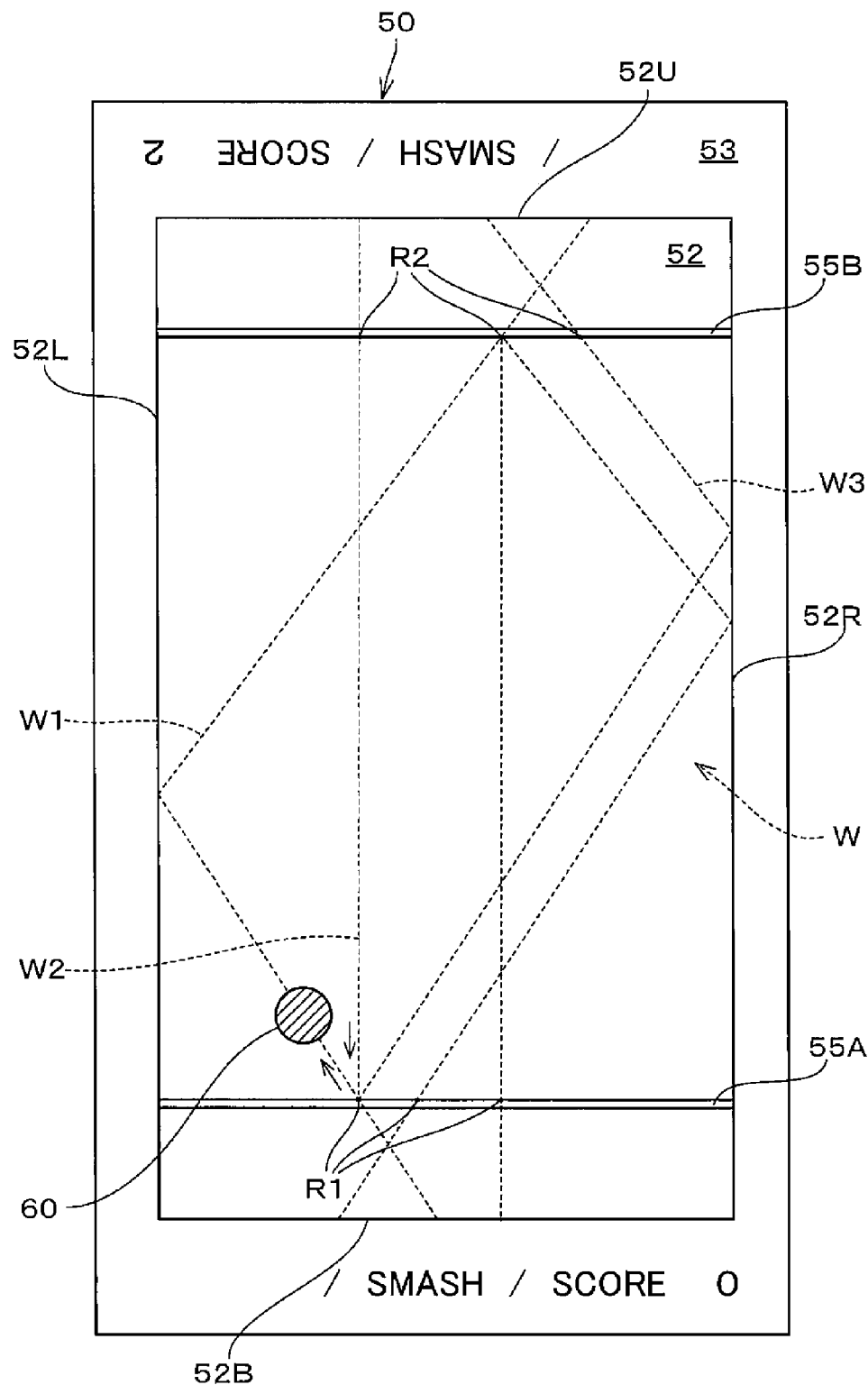
FIG. 4 is a schematic view of a game screen.

FIG. 4 is a schematic view illustrating a game screen of the music game to be executed at the game machine 2. The game screen 50 includes a game area 52 to guide operation timing for the player, and an information area 53 to display scores and the like of the respective player (the both players playing at the game machines 2 matched as the opponents by the center server 3). The game area 52 is formed rectangular. A first reference portion 55A and a second reference portion 55B as reference portions are arranged at both ends of the game area 52 in the longitudinal direction as being mutually opposed. The respective reference portions 55A, 55B are extended linearly in the direction perpendicular to the longitudinal direction of the game area 52.

The respective reference portions 55A, 55B are utilized respectively as a reference for current time in the game by the both players playing at the two matched game machines 2. Specifically, the first reference portion 55A is utilized as a reference for current time for a first player (one player of the two matched game machines 2) and the second reference portion 55B is utilized as a reference for current time for a second player (the other player of the two matched game machines 2). The reference portions 55A, 55B are respectively in different color to distinguish the respective players. In the example of FIG. 4, the first reference portion 55A is denoted by a red line and the second reference portion 55B is denoted by a blue line. Also, the information area 53 is arranged around the game area 52. One end side thereof in the longitudinal direction of the game area 52 is utilized for displaying the score and the like of the one player and the other side thereof is utilized for displaying the score and the like of the other player.

The reference portions 55A, 55B respectively include a plurality of rebound points arranged at certain intervals. The plurality of rebound points R1 included in the first reference portion 55A and the plurality of rebound points R2 included in the second reference portion 55B are mutually connected respectively by a plurality of pathways W. Specifically, the plurality of pathways W arriving at the plurality of rebound points R2 included in the second reference portion 55B are arranged as starting from one rebound point R1 of the first reference portion 55A. Similarly, the plurality of pathways W arriving at the plurality of rebound points R1 included in the first reference portion 55A are arranged as starting from one rebound point R2 of the second reference portion 55B.

The plurality of pathways W extended from the rebound point R1 of the first reference portion 55A are extended to an upper end part 52U at the second reference portion 55B side as passing through the rebound points R2. Further, the plurality of pathways W extended from the rebound point R2 of the second reference portion 55B are extended to an lower end part 52B at the first reference portion 55A side as passing through the rebound points R1. In the example of FIG. 4, all of pathways W are indicated by broken lines. As illustrated in FIG. 4, on the one rebound point R1 of the first reference portion 55A, there is provided three pathways W1, W2, W3 which are extended from the rebound point R1 toward three rebound points R2 included in the second reference portion 55B as the plurality of pathways W. During playing the music game, that is, during reproducing the music, an object 60 is displayed on the pathway W connecting the rebound point R1 and the rebound point R2 in accordance with the sequence data 28 as an operational instruction indicator which instructs an operation. In addition, in FIG. 4, the respective pathways W1, W2, W3 are indicated by broken lines for convenience of description. However, any of the plurality of pathways W is not displayed on the actual game screen 50A.

The object 60 appears at the rebound point R1 or the rebound point R2 at appropriate timing during the music. Then, the object 60 is moved from the appearance rebound point R1, R2 toward the rebound point R1, R2 which is located at the other side on the pathways W extended from the appearance rebound point R1, R2 in accordance with course of the music. Subsequently, the object 60 disappears when an appropriate operation is performed with arrival of the project 60. In accordance with disappearance of the object 60, the next object 60 appears at the rebound point R1, R2 of the reference portion 55A, 55B at which the appropriate operation is performed. That is, the arrival position of the object 60 serves as an appearance position of the next object 60.

The object 60 appearing at the appearance position is moved to the rebound point R1, R2 which is located at the opposite side to the appearance position. Accordingly, when the appropriate operation is performed, the object 60 is moved alternately in a repeated manner between the reference portions 55A, 55B as if the object 60 is rebounded at the rebound points R1, R2. On the other hand, when the appropriate operation is not performed, the object 60 is moved to the upper end part 52U or the lower end part 52B as passing through the reference portion 55A, 55B along the pathway W. Then, the position of the end part 52U, 52B at which the object 60 arrives functions as the appearance position of the next object 60. Accordingly, when the appropriate operation is not performed, the movement direction of the object 60 is varied toward the reference portion which is located at the opposite side to the end part 52U, 52B as if the object 60 is rebounded at the end part 52U, 52B.

As the appropriate operation, there is required a touch operation to touch the position of the reference portion 55A, 55B at which the object 60 arrives in music with the arrival of the object at the reference portion 55A, 55B to each player. When each player performs the touch operation, gap time is detected between the time at which the object 60 coincides with the reference portion 55A, 55B and the time at which each player performs the touch operation. The player's operation is evaluated to be higher with decrease of the gap time. Also, an effective sound is reproduced at the speaker 14 in accordance with the touch operation. Well known methods may be adopted as a reproduction method of the effective sound. For example, as the well known method of effective sound reproduction, there exist a method to add an effective sound onto music while reproducing the music, and a method to deaden music when a mistake occurs and to reproduce an effective sound corresponding to the mistake operation. Also, for example, there exists a method in which music is divided and allocated to respective operational timing so that a part of the music allocated to the operational timing is reproduced when an appropriate operation is performed (method in which the music is formed by an appropriate operation for operational timing. Therefore, when an operational mistake occurs, music part allocated to operational timing is not reproduced).

In the example of FIG. 4, since the object 60 is on the way of moving toward the rebound point R2 of the second reference portion 55B on the pathway W1, the second player who utilizes the second reference portion 55B as the current time reference in music of the arrival at the second reference portion 55B is required to perform an touch operation on the position of the second reference portion 55B at which the object 60 arrives. Also, the object 60 is displayed in a color corresponding to the reference portion 55A, 55B to which the object 60 is oriented. That is, in the example of FIG. 4, the object 60 is displayed in blue until arriving at the rebound point R2 of the second reference portion 55B and the next object 60 appearing at the arrival rebound point R2 is displayed in red.

Figure 5:
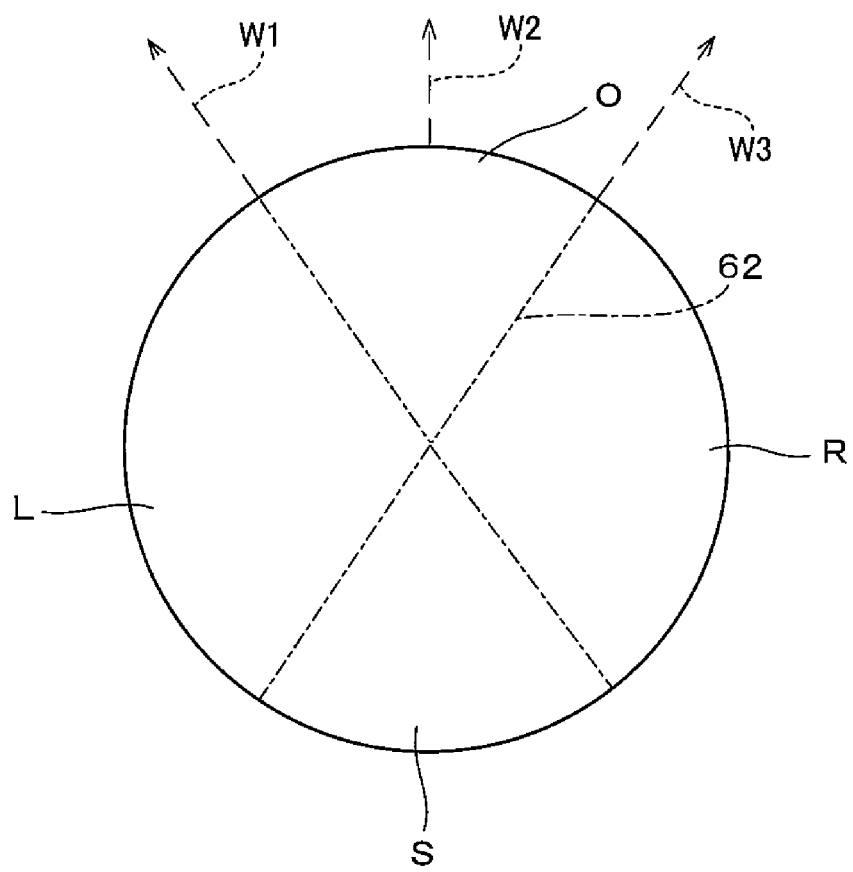
FIG. 5 is an explanatory view of regions of an object.

The pathway W for movement from the rebound point R1, R2 at which the object 60 arrives to the rebound point R1, R2 at the opposite side is determined in accordance with a position of the object 60 when the reference portion 55A, 55B is touched. To facilitate position comparison, the object 60 is divided into plural regions. FIG. 5 is an explanatory view of regions of the object 60. Broken lines in FIG. 5 respectively denote the pathways W1, W2, W3 and dashed-dotted lines 62 denote boundaries of the respective regions.

In the example of FIG. 5, the object 60 is divided into four regions of a contact region S being the vicinity of a contact point which firstly contacts to the reference portion 55A, 55B, a right side region R and a left side region L respectively having a boundary with the contact region S, and the other region O. As the pathway on which the object 60 is moved, when the touch operation is performed on the vicinity of contact region S or the other region O (including the regions), the linear pathway W2 directed to the rebound point R1 with the shortest distance is selected among the pathways W directing the rebound point R1 from the rebound point R2. When the touch operation is performed on the vicinity of the left side region L (including the region), the third right side pathway W3 directed to the rebound point R1 via a side wall 52R at the longitudinally right side of the game area 52 is selected. When the touch operation is performed on the vicinity of the right side region R (including the region), the first left side pathway W1 directed to the rebound point R1 via a side wall 52L at the longitudinally left side of the game area 52 is selected. In short, the movement pathway on which the object 60 is to be directed to the next reference portion 55A, 55B is determined in accordance with positional relation between the operation position of the touch operation and the position of the object 60. Since the movement distance differs corresponding to the movement pathway, there occurs difference among the movement distances for the object 60 to be moved to the next reference portion 55A, 55B in accordance with positional relation between the operation position and the position of the object 60. Meanwhile, operation timing at which the touch operation is to be performed on the object 60, that is, the timing at which the object 60 is to be arrived at the reference portion 55A, 55B, is constant regardless of the movement pathway. Accordingly, there occurs difference in movement speed of the object 60 in accordance with the movement pathway. In short, the pathway W and movement speed of the object 60 to be moved toward one player are varied in accordance with the touch operation of the other player. Since the level of difficulty of the game is varied accordingly, operation in consideration of influences to the counterpart player is required to each player.

Figure 6:
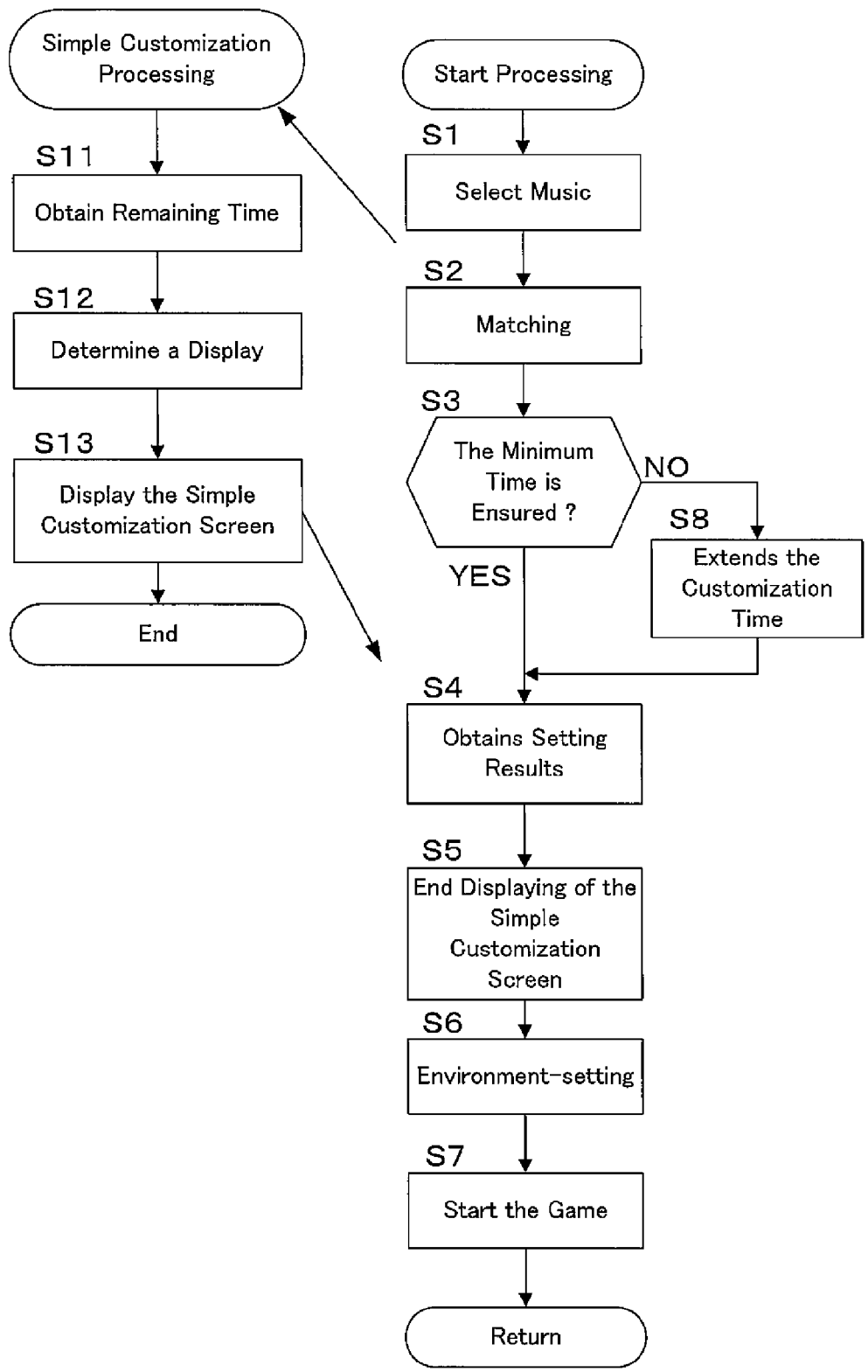
FIG. 6 is a view illustrating an example of a flowchart of a game start processing routine which is performed by a game control portion for playing a game.

Next, processes performed by the game control portion 11 when the game is played at the game machine 2 will be described. FIG. 6 is a view illustrating an example of a flowchart of a game start processing routine which is performed by the game control portion 11 for playing the game. In a case that conditions for instructing game start such as payment for reasonable counter value required for playing the game are satisfied, the control unit 10 causes the game control portion 11 to start the routine of FIG. 6.

In Step S1 of the routine of FIG. 6, the game control portion 11 performs a process to make a player selects music. This process is a process for displaying music selection screen and making the player selects music on the music selection screen. Also, the maximum time (e.g., 30 seconds) is set for the time in which music is selected on the music selection screen. When music is not selected within the maximum time, the game control portion 11 selects music at random or based on predetermined conditions such as difficulty and a selected frequency.

Further, the game control portion 11 executes a simple customization processing routine after completion of the process of Step S1. Therefore, until this routine is completed, the game control portion 11 performs the start processing routine and the simple customization processing routine in parallel. The simple customization processing routine is a routine for displaying a customization screen to display customization information that setting is left to the player in the game. Then, in the simple customization processing routine, the game control portion 11 firstly obtains remaining time in Step S11. Here, matching time to be described later is utilized as the remaining time. Although details will be described later, the maximum time is set as the matching time, and then, the matching time is increased and decreased within the maximum time in accordance with the music selection time and the time required for the matching process. Accordingly, the remaining time is also increased and decreased in accordance with increase and decrease of the matching time.

Subsequently, in Step S12, the game control portion 11 determines a display range of the customization information to be displayed on the simple customization screen. The customization information includes both of customization entries corresponding to elements constituting the game such as effective sounds and customization entries which are plurally prepared for each customization entry. Further, the display range is determined in accordance with the remaining time obtained in Step S11 and predetermined priority levels, for example, such that the customization entry is increased by one for each predetermined remaining time (e.g., 10 seconds) in descending order of previously-set priority levels of the customization entries. As described above, the customization information includes the plurality of customization items which are prepared for each customization entry. Therefore, for example, it is also possible to set the customization entries being the display targets to be constant and to increase and decrease the number of customization items for each customization entry in accordance with the remaining time such that the customization items of the customization entry prepared as being ten items in maximum is decreased to five when the remaining time is short. Thus, variation of the display range of the customization information includes both variations of the customization entries and the customization items such as increase and decrease of the customization entries as well as increase and decrease of the customization items.

Figure 7:
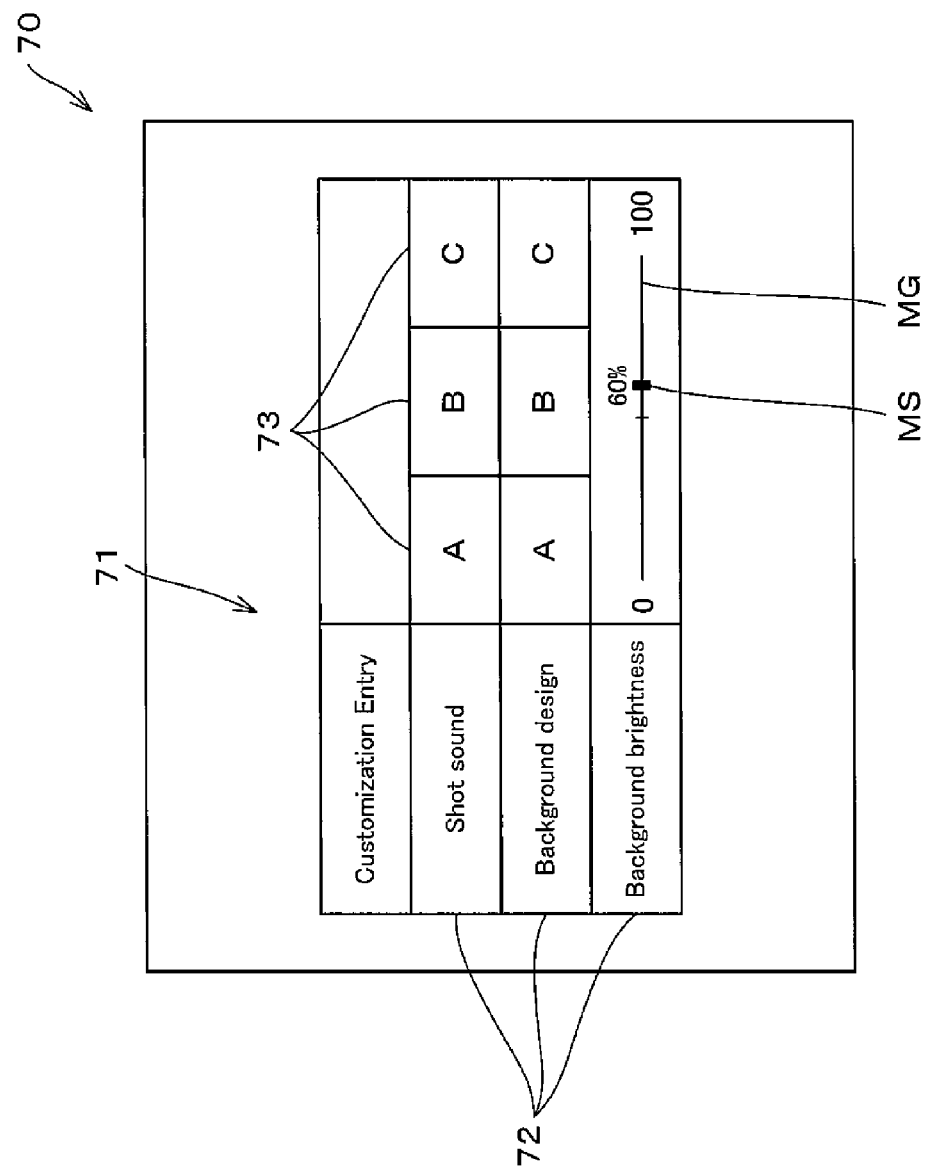
FIG. 7 is a view illustrating an example of a simple customization screen.

Next, in Step S13, the game control portion 11 displays on the monitor 8, the simple customization screen including the customization information of the display range corresponding to the determination result of Step S12 and ends the routine at this time. FIG. 7 is a view illustrating an example of the simple customization screen. As illustrated in FIG. 7, the simple customization screen 70 includes a customization range display area 71. The customization range display area 71 includes the customization entries 72 and the selectable customization items 73 prepared for each customization entry 72. In the example of FIG. 7, as the customization entries 72, there are displayed "Shot sound" to be output when the touch operation is performed on the object 60, "Background design" to be utilized as a background of the game area 52, and "Background brightness" to set brightness of the background design of the game area 52. Further, as the selectable customization items 73, "A", "B" and "C" are prepared for "Shot sound" and "Background design", and then, a gage MG is prepared for "Background brightness" to set brightness. The player can select any of the selectable customization items 73 for each customization entry 72. In addition, in the case of "Background brightness in the example of FIG. 7, an instruction portion MS on the gage MG can be moved.

Meanwhile, returning to FIG. 6, in the game start processing routine which is executed in parallel with the simple customization processing routine, the game control portion 11 performs a process of matching the respective game machines 2 to determine an opponent for each player in Step S2 being subsequent to Step S1. The process is a process for making two players plays within the same game area via the network 5. And, in this process, matching-request is performed against the center server 3. Further, this process is also a process for performing various environment-setting necessary for playing a common game between both game machines 2 of the matched players based on the result of the matching-request. In addition, as an example to make the game machines plays the common game between the game machines 2 of the matched players, relation of a master machine and a slave machine is set between the game machines 2, the master machine mainly performs data transmitting-receiving and the like with the center server 3, and the master machine may control the slave machine so that the mutual game details are synchronized. Also, the processes to perform matching are not limited to utilize the center server 3. For example, in a case of match-up within the same arcade 6, the processes may have the configuration that the game machine 2 which firstly satisfies start conditions for instructing game start is to be in an entry-waiting state to wait satisfaction of start conditions of the other game machine 2, and that the entry-waiting game machine 2 and the game machine 2 which subsequently satisfy the start conditions are immediately matched without being connected to the center server 3.

Further, the maximum time (e.g., 60 seconds) is set for the matching processing. Here, remaining time of the maximum time which is set for the music selection is also available for the matching processing. That is, the total time (e.g., 90 seconds) of the maximum time set for the music selection and the maximum time for the matching processing is set as the maximum time for the matching time for executing the matching processing. Therefore, for example, when the music selection is completed in 10 seconds, the matching time is available up to 80 seconds.

Next, in Step S3, the game control portion 11 determines whether or not the minimum time is ensured as the time from display start of the simple customization screen 70 to completion of the matching process. For example, the minimum of time considered to be necessary for setting the respective customization entries 72 of the simple customization screen 70 such as 10 seconds is utilized as the minimum time. When negative determination is obtained in Step S3, the game control portion 11 proceeds to Step S8. In Step S8, the game control portion 11 extends the time in which customization can be performed on the simple customization screen 70 so as to ensure the minimum time. For example, the extended time is set to be 10 seconds (as corresponding to the minimum time). Accordingly, when the matching time is ensured as being the minimum time or longer, the matching time serves as the customization time of the present invention to be allocated to setting of the customization information. When the matching time is not ensured to reach the minimum time, the total time of the matching time and the extended time serves as the customization time to be allocated for setting of the customization information.

On the contrary, when positive determination is obtained in Step S3 (when the minimum time is ensured as the customization time), the game control portion 11 proceeds to Step S4. In Step S4, the game control portion 11 obtains setting results of the respective customization entries 72 being set on the simple customization screen 70. In Step S5, the game control portion 11 ends displaying of the simple customization screen 70. Subsequently, in Step S6, the game control portion 11 performs environment-setting required for starting the game. The environment-setting includes a process to reflect setting results obtained in Step S4 to the game screen and the like. Subsequently, in Step S7, the game control portion 11 starts the game and ends the current routine.

As described above, in the present embodiment, there is displayed the simple customization screen 70 for setting customization entries 72 during the matching time. Also, the matching time is varied owing to the music selection time, an opponent entry situation and the like. In contrast, the display range of the customization information included in the simple customization screen 70 is varied so that appropriate setting can be performed in accordance with the matching time. And, in a case that the matching time is short, the customization information is displayed on the simple customization screen 70 as the customization target in a range so as to be capable of being selected in the short time. Accordingly, the customization entries 72 can be set efficiently and effectively by utilizing the matching time. In this manner, since the matching time can be effectively utilized, the time required until game starting can be shortened.

Further, in a case that appropriate time cannot be ensured for setting the customization entries 72 owning to too short matching time, the minimum time for setting the customization entries 72 can be ensured. Accordingly, the minimum of time necessary for setting the customization entries 72 can be ensured.

In the above embodiment, the control unit 10 of the game machine 2 serves as partial information presenting device and extending device by causing the game control portion 11 to execute the routine of FIG. 6.

Not limited to the above embodiment, the present invention can be carried out in an appropriate embodiment. In the above embodiment, the simple customization screen 70 is configured so that a part of the entire customization information is displayed in specific priority order which is previously set. For example, as the specific priority order, there may be used an order that the priority order of the customization entry 72 become higher with a less number of prepared customization items 73. In this case, since setting can be performed against more customization entries 72 in a shorter time, effective setting can be comfortably performed in accordance with the remaining time. Also, as the specific priority order, there may be applied various types such as frequency of customization setting and convenience for a selected music. As an example of the predetermined priority order utilizing a course of a game, in a case of a game in which a new item can be obtained corresponding to game records with informing a player of a newly obtained item corresponding to past game records, there may be applied an order that a priority order of newly obtained item becomes high (possibly to be at the top priority) at the time of the next play.

Further, the game control portion 11 may be configured to cause displaying of a normal customization screen capable of displaying entire customization information separately from the simple customization screen 70. For example, the game control portion may be configured to cause displaying of the normal customization screen when conditions are satisfied such that a dedicated button (not illustrated) is pressed in an entry state before the game start processing is started after payment for reasonable counter value required for the player to play the game. And, the normal customization screen may be configured to be capable of setting the specific priority order to be displayed on the simple customization screen 70. In this case, the priority order to be displayed on the simple customization screen 70 can be set by a player oneself on via the normal customization screen. As an example of the configuration capable of setting the specific priority order, the normal customization screen may be configured so that the player can previously set what entries are to be displayed for each case while presenting classification corresponding to the remaining time (e.g., the remaining time being 60 seconds, 30 seconds and 15 seconds). For example, in like this case, there may be displayed entries A, B and C when the remaining time is 60 seconds, and only the entries A and B when the remaining time is 30 seconds.

Further, the present invention is not limited to the embodiment that a part of the entire customization information is displayed on the simple customization screen 70 in accordance with the specific priority order which is previously set.

For example, the simple customization screen may be configured to display information of a predetermined range which is previously set out of the entire customization information in preference to other information. Since being in preference to the other information, the information of the predetermined range is managed in preference to the other information at least to be included in the display range even in a case that the other information among the entire customization information is not displayed. For example, such setting of the predetermined range may be performed via a setting screen which is prepared on a predetermined website by utilizing an ID and the like being unique for each player. Alternatively, in the embodiment having the above normal customization screen, the normal customization screen may be configured to be capable of setting the predetermined range. Further, the specific priority order and the predetermined range coexist, and displaying order within the predetermined range may be determined in accordance with the specific priority order.

Figure 8:
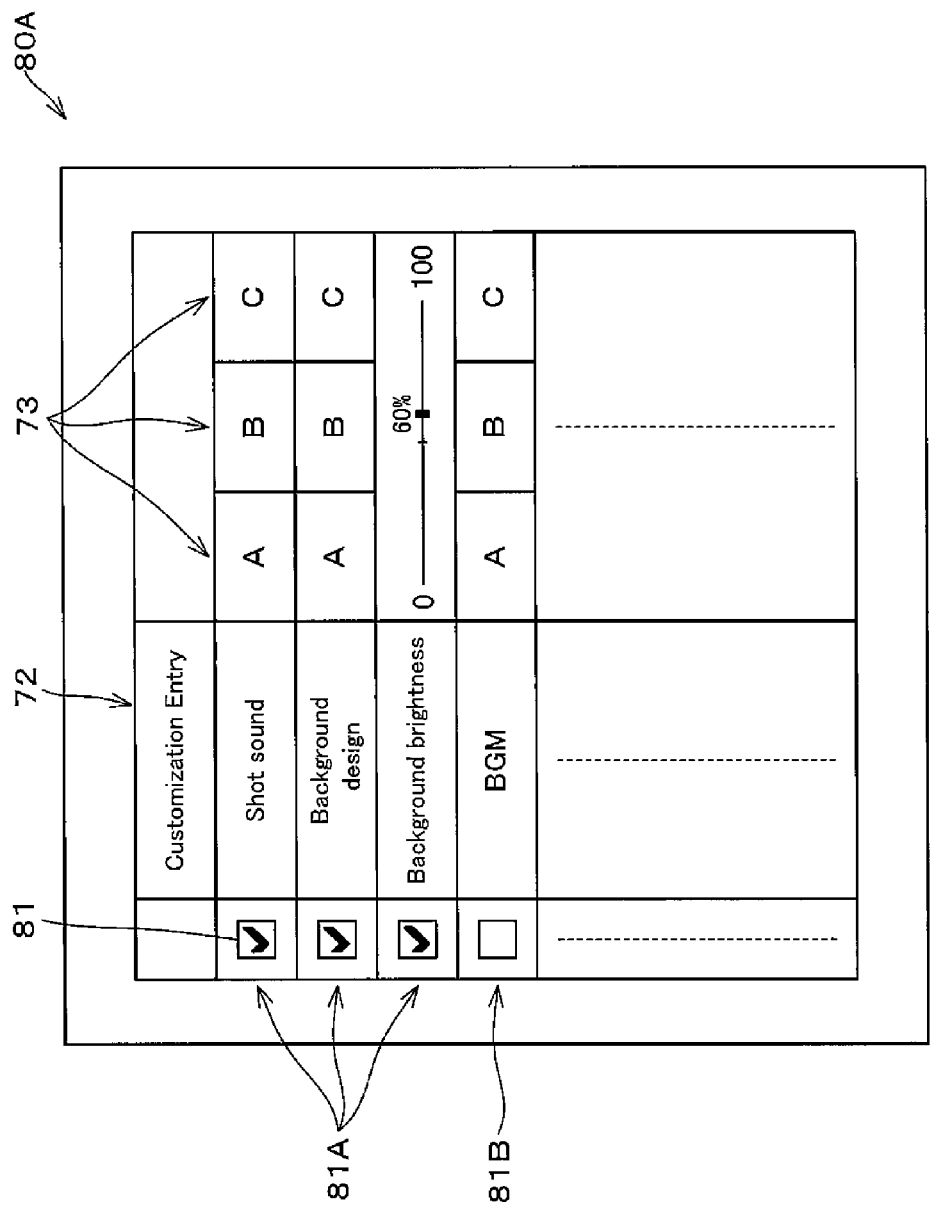
FIG. 8 is a view illustrating an example of a normal customization screen.

FIG. 8 is a view illustrating an example of the normal customization screen 80A capable of setting the predetermined range. As illustrated in FIG. 8, check boxes 81 are arranged at the left side of the respective customization entries 72 on the normal customization screen 80A caused to be displayed by the game control portion 11. The check boxes 81 are configured to be varied into a selected state 81A by being selected (by receiving touch operation). Discrimination information is added to the customization entries 72 of which check box 81 is varied into the selected state 81A so as to be discriminated as the predetermined range information from the other information (the other customization entries 72). On the contrary, in a case of being varied into a selection released state 81B from the selected state 81A, the discrimination information is deleted. And, in this case, based on the discrimination information added to the respective customization entries 72, the simple customization screen 70 is configured to display the respective customization entries 72 to which the discrimination information is added as the predetermined range information in preference to the other customization entries 72 (with the check box 81 being in the selection released state 81B). Further, in this case, in Step S3 of the routine of FIG. 6, it is also possible to determine whether or not selection of the customization items are performed in all of the customization entries included in the predetermined range, and then, the time may be extended in Step S8 as proceeding to Step S8 when negative determination is obtained. In this case, the control unit 10 serves as entire information presenting device and discrimination information adding device of the present invention through the game control portion 11.

Figure 9:
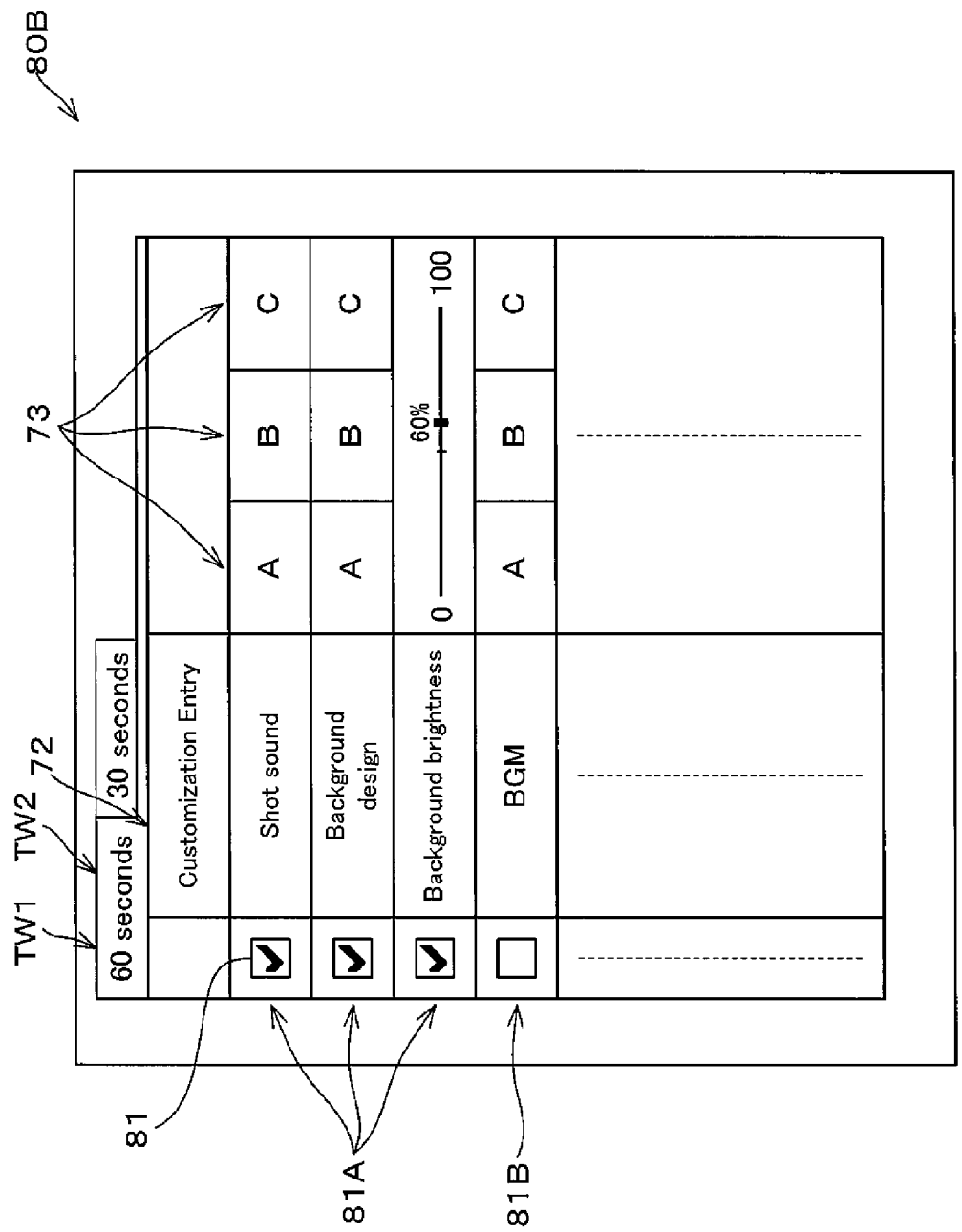
FIG. 9 is a view illustrating another example of the normal customization screen.

Further, FIG. 9 is a view illustrating another example of the normal customization screen. As illustrated in FIG. 9, as in comparison with the normal customization screen 80A of FIG. 8, the normal customization screen 80B of the other example has two tabs TW1, TW2 corresponding to the remaining time, that is, the first tab TW1 corresponding to a case of the remaining time being 60 seconds and the second tab TW2 corresponding to the remaining time being 30 seconds. The example of FIG. 9 illustrates a state that the first tab TW1 is selected. Then, the information of the priority order is added to the customization entries 72 of which check box 81 is in the selected state 81A as the entries being included in the displaying range to be displayed on the simple customization screen 70 in the case of the remaining time being 60 seconds. On the contrary, the information of the priority order is deleted from the customization entries 72 of which check box 81 is in the selection released state 81B. The second tab TW2 is structured similarly to the first tab TW1. That is, the information of the priority order is added to the customization entries 72 of which check box 81 is in the selected state 81A as the entries being included in the displaying range to be displayed on the simple customization screen 70 in the case of the remaining time being 30 seconds while the information of the priority order is deleted from the customization entries 72 in the selection released state 81B. In this case, the control unit 10 serves as priority information adding device of the present invention through the game control portion 11. In addition, it is also possible to further arrange a button (not illustrated) to switch the normal customization screen between the screen structured as FIG. 8 and the screen structured as FIG. 9.

Figure 10:
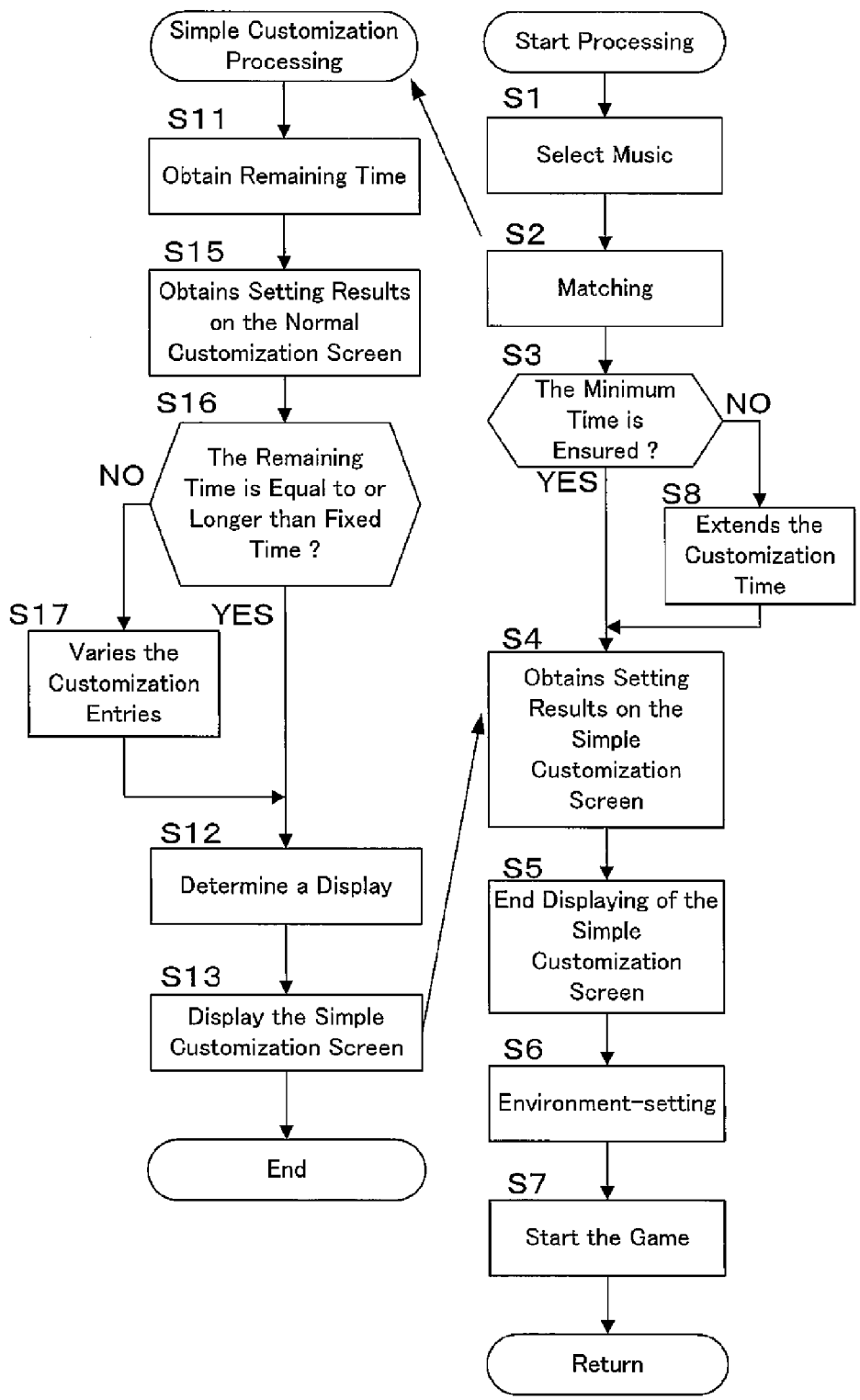
FIG. 10 is a view illustrating an example of a flowchart of a modified example of the start processing routine which is performed by the game control portion.

Further, the present invention may be configured so that the customization entries which are set as display targets on the normal customization screen are displayed on the simple customization screen and the customization entries to be displayed on the simple customization screen are varied in accordance with predetermined conditions from the set ones when the remaining time is short. FIG. 10 is a view illustrating an example of a flowchart of a modified example of the start processing routine which is performed by the game control portion 11.

Based on comparison between FIG. 6 and FIG. 10, Step S15, Step S16 and Step S17 which are not included in the routine of FIG. 6 are added to the simple customization processing routine of FIG. 10. Here, description of the step being common to FIG. 6 is omitted. As illustrated in FIG. 10, in the modified example, the game control portion 11 performs a process of Step S15 after completing the process of Step S11. In Step S15, the game control portion 11 obtains information of the customization entries which are set by a player to be displayed on the simple customization screen as the setting details on the normal customization screen. Subsequently, in Step S16, the game control portion 11 determines whether or not the remaining time is equal to or longer than fixed time considered to be sufficient for setting the customization entries. For example, the fixed time may be 40 seconds. When the determination is positive, that is, when the remaining time is equal to or longer than the fixed time, the game control portion 11 performs the similar processings to FIG. 6 thereafter as proceeding to Step S12. On the contrary, when the determination is negative in Step S16, that is, the remaining time is determined to be shorter than the fixed time, it proceeds to Step S17. In Step S17, the game control portion 11 varies the customization entries being targets to be displayed on the simple customization screen based on the predetermined conditions. For example, the predetermined conditions utilize a condition of customization entries with less number of customization items. That is, in this case, in Step S17, the game control portion 11 varies the display target entries to be displayed on the simple customization screen to a fixed number of customization entries in ascending order of the number of the customization items. Further, in a case of existence with the same number of customization items, there may be performed the varying so that the customization entry which corresponds to the player's setting details is preferentially included in the display target entries. In this embodiment, the control unit 10 serves as display target varying device by causing the game control portion 11 to execute Step S15 to Step S17 of FIG. 10.

Further, the present invention may be configured so that past setting details are carried on to be available in the next play and later by causing a player to input an ID before setting the customization information by utilizing an ID being unique for each player.

In the above embodiments, the game machine 2 is configured to reproduce music and execute a music game in which the operational instruction indicator is moved toward the reference portion based on playing time of the music. However, the present invention is not limited to such configuration. For example, in the game machine 2, there may be executed a variety of match-up type games with the customization information that setting thereof is left by a player such as quiz-games. Further, in the above embodiments, the matching time being waiting time without game proceeding is utilized as the customization time. However, the present invention is not limited to such embodiments. Other game waiting time being necessary owing to reading time and the like of a main game may be utilized as the game waiting time to be utilized as the customization time. For example, the time of the abovementioned entry-state may be utilized as such waiting time. Accordingly, not limited to a game in which matching is performed, as games to be executed by the game machine 2, there may be applied various games in which waiting time occurs. Further, a game system of the present invention may be actualized in appropriate embodiments such as a business-use game machine placed in a commercial facility, a home-use stationary game machine, a portable game machine and a game system actualized by utilizing a network.

What is claimed is:

1. A game system comprising:
a display device that displays a screen of a game; and
partial information presenting device that causes the display device to display a part of customization information of which setting is to be performed by a player on the game by utilizing waiting time of the game, and wherein the partial information presenting device varies a display range which is to be displayed at the display device as a part of the customization information in accordance with customization time allocated to setting of the customization information among the waiting time of the game so that the amount of the customization information included in the display range is increased when the customization time is long and is decreased when the customization time is short.

2. The game system according to claim 1, wherein a match-up type game as competing with results between matched opponents is executed as the game, and matching time for the matching included in the waiting time of the game is utilized as the customization time.

3. The game system according to claim 1, wherein the partial information presenting device varies the display range so that information of a predetermined range among the customization information is included in the display range in preference to other information.

4. The game system according to claim 3, further comprising a extending device that extends the customization time, and wherein the extending device extends the customization time when setting the information of the predetermined range is not completed.

5. The game system according to claim 3, further comprising a discrimination information adding device that adds discrimination information to be utilized for discriminating the information of the predetermined range among the customization information from other information, and wherein the partial information presenting device displays the display range so that information to which the discrimination information is added among the customization information is included as the information of the predetermined range.

6. The game system according to claim 1, wherein the partial information presenting device displays the part of the customization information within the display range in order of previously-set specific priority order.

7. The game system according to claim 6, further comprising priority information adding device that adds information of priority order to at least the part of the customization information, and wherein the partial information presenting device displays the part of the customization information sequentially within the display range by utilizing the priority order information added by the priority information adding device as the specific priority order.

8. The game system according to 7, wherein the partial information presenting device further comprising display target varying device that varies information to be included in the display range as the part of the customization information from information based on the priority order information to information based on predetermined conditions when the customization time is shorter than fixed time.

9. The game system according to 8, wherein the customization information includes customization entries respectively corresponding to elements which constitute the game and a plurality of customization items which are prepared as options for each customization entry,
the partial information presenting device utilizes the customization entries as units of information to be included in the display range being the part of the customization information, and
the display target varying device utilizes a condition that priority order increases with decrease of the number of the plurality of customization items of each customization entry as the predetermined conditions.

10. The game system according to 5, further comprising a entire information presenting device that causes the display device to display a normal customization screen capable of displaying the entire customization information, and wherein at least one of the discrimination information adding device and the priority information adding device is provided in the normal customization screen.

11. The game system according to 7, further comprising a entire information presenting device that causes the display device to display a normal customization screen capable of displaying the entire customization information, and wherein at least one of the discrimination information adding device and the priority information adding device is provided in the normal customization screen.

12. The game system according to 8, further comprising a entire information presenting device that causes the display device to display a normal customization screen capable of displaying the entire customization information, and wherein at least one of the discrimination information adding device and the priority information adding device is provided in the normal customization screen.

13. The game system according to 9, further comprising a entire information presenting device that causes the display device to display a normal customization screen capable of displaying the entire customization information, and wherein at least one of the discrimination information adding device and the priority information adding device is provided in the normal customization screen.

14. A method of controlling a computer, which is mounted in a game system including a display device that displays a screen of a game, comprising the processes;
a partial information presenting process that causes the display device to display a part of customization information of which setting is to be performed by a player on the game by utilizing waiting time of the game; and
a process in the partial information presenting process to vary a display range which is to be displayed at the display device as a part of the customization information in accordance with customization time allocated to setting of the customization information among the waiting time of the game so that the amount of the customization information included in the display range is increased when the customization time is long and is decreased when the customization time is short.

15. A non-transitory storage medium storing a computer program for a game system being configured to allow a computer mounted in the game system including a display device that displays a screen of a game to serve as;

a partial information presenting device that causes the display device to display a part of customization information of which setting is to be performed by a player on the game by utilizing waiting time of the game; and wherein the partial information presenting device serves further as a device that varies a display range to be displayed at the display device as a part of the customization information in accordance with customization time allocated to setting of the customization information among the waiting time of the game so that the amount of the customization information included in the display range is increased when the customization time is long and is decreased when the customization time is short.

* * * * *